(12) United States Patent
Secord

(10) Patent No.: US 6,869,143 B2
(45) Date of Patent: Mar. 22, 2005

(54) RECLINER CLUTCH MECHANISM FOR VEHICLE SEAT

(75) Inventor: Tyrone Secord, Troy, MI (US)

(73) Assignee: BAE Industries, Inc., Centerline, MI (US)

( * ) Notice: Subject to any disclaimer, the term of this patent is extended or adjusted under 35 U.S.C. 154(b) by 150 days.

(21) Appl. No.: 10/404,369

(22) Filed: Apr. 1, 2003

(65) Prior Publication Data

US 2004/0195889 A1 Oct. 7, 2004

(51) Int. Cl.$^7$ .................................................. B60N 2/02
(52) U.S. Cl. .................. 297/362; 297/378.12; 297/374; 297/367

(56) References Cited

U.S. PATENT DOCUMENTS

| | | | |
|---|---|---|---|
| 4,070,058 A | 1/1978 | Muehling | 297/374 |
| 4,332,418 A | 6/1982 | Strowik | 297/362 |
| 4,408,799 A | 10/1983 | Bowman | 297/361 |
| 4,871,416 A | 10/1989 | Fukuda | |
| 5,534,312 A | 7/1996 | Hill et al. | |
| 5,664,836 A | 9/1997 | Takagi | 297/367 |
| 5,664,837 A | 9/1997 | Takagi | 297/367 |
| 5,686,789 A | 11/1997 | Schoenbach et al. | |
| 5,736,002 A | 4/1998 | Allen et al. | |
| 5,782,986 A | 7/1998 | Butterbaush et al. | |
| 6,102,480 A | 8/2000 | Asano | 297/366 |
| 6,113,190 A | 9/2000 | Negi et al. | 297/378.1 |
| 6,194,833 B1 | 2/2001 | DeTemple et al. | |
| 6,214,707 B1 | 4/2001 | Thakur et al. | |
| 6,260,923 B1 | 7/2001 | Yamada et al. | 297/366 |
| 6,267,443 B1 | 7/2001 | Kurita et al. | 297/374 |
| 6,284,050 B1 | 9/2001 | Shi et al. | |
| 6,326,301 B1 | 12/2001 | Venkatesan et al. | |
| 6,390,557 B1 | 5/2002 | Asano | 297/367 |
| 2002/0041120 A1 | 4/2002 | Glaspie et al. | 297/374 |

FOREIGN PATENT DOCUMENTS

WO    WO 9853480    11/1998

OTHER PUBLICATIONS

El–Habachi et al., "Emission of excimer radiation from direct current, high pressure, hollow cathode discharges, "Appl. Phys. Lett., vol. 72, No. 1, Jan. 5, 1998, pp. 22–24.

El–Habachi et al., "Generation of intense excimer radiation from high–pressure hollow cathode discharges," Appl. Phys. Lett. vol. 73, No. 7, Aug. 17, 1998, pp. 885–887.

(List continued on next page.)

*Primary Examiner*—Peter M. Cuomo
*Assistant Examiner*—Erika Garrett
(74) *Attorney, Agent, or Firm*—Gifford, Krass, Groh, Sprinkle, Anderson & Citkowski, P.C.

(57) ABSTRACT

A recliner clutch mechanism for use with a vehicle seat having a seat bottom and an upwardly extending and pivotally movable seat back. A lock plate having first and second faces is secured in translating fashion between the seat bottom and seat back. A first actuating plate is located in proximity to the first face of the lock plate and urges the lock plate to engage against the seat back in a first position. A second actuating plate is located in proximity to the second face of the lock plate and causing the lock plate to disengage from the seat back in a second release position. A spring engages the seat back in a forward rotating direction. A release handle and lever assembly is in operative communication with a secondary spring and, upon actuation, releases the engaging force exerted by the first plate, concurrent with influencing the second actuating plate against the lock plate in the second release position.

14 Claims, 4 Drawing Sheets

OTHER PUBLICATIONS

Fleisch et al., "An PS Study of the UV Photoreduction of Transition and Noble Metal Oxides," Applied Surface Science, vol. 26, 1986, pp. 488–497.

Fleisch et al., "Reduction of Copper Oxides By UV Radiation And Atomic Hydrogen Studied By KPS, " (Abstract) Application of Surface Science, vol. 10. No. 1, Jan–Feb. 1982, pp. 51–62.

Frame et al., "Microdischarge devices fabricated in silicon-"Appl. Phys. Lett. vol. 71, No. 9, Sep. 1, 1997, pp. 1165–1167.

Hogelshalz et al., "Stent–discharge driven excimer UV sources and their application," Appl. Surf. Sci. vol. 54, 1992, pp. 410–497.

Ryan et al., "Copper interconnects for advanced logic and DRAM," IEDM Digest, 1998, pp. 258–259.

Schoenbach et al., "Micohollow cathode discharges," Appl. Phys. Lett. vol. 68, No. 1, Jan. 1, 1996, pp. 13–15.

Zhang et al., "Efficient excimer ultraviole sources from a dielectric barrier discharge in rare–gas halogen mixtures," J. Appl. Phys vol. 80, Issue 2. Jul. 15, 1996, pp. 633–638.

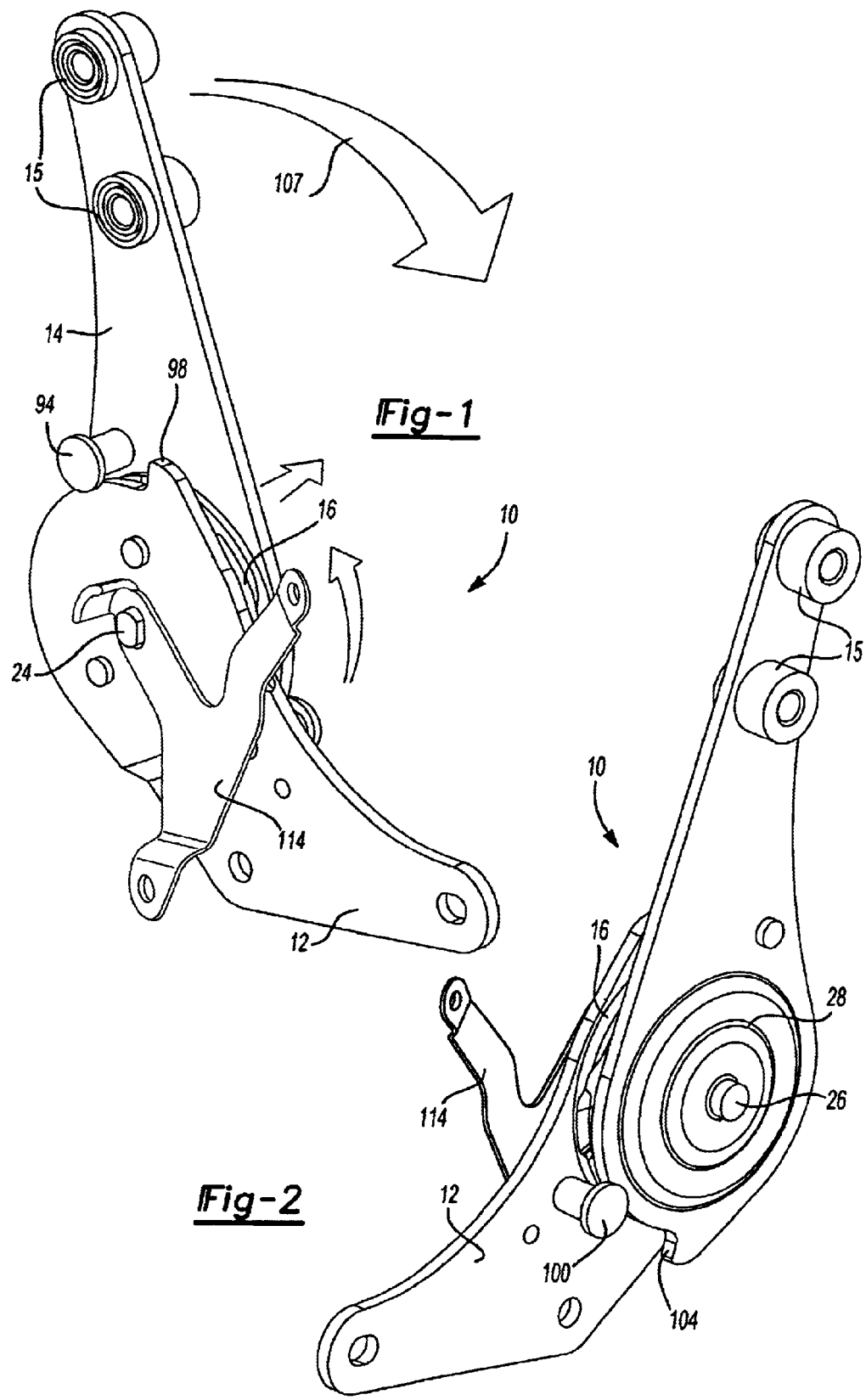

RECLINER CLUTCH MECHANISM FOR VEHICLE SEAT

BACKGROUND OF THE INVENTION

1. Field of the Invention

The present invention relates generally to seat back recliner mechanisms. More specifically, the present invention discloses a recliner clutch mechanism having a seat bottom and an upwardly directed seat back and incorporating therebetween a non-rotating and bi-directionally actuating lock plate established between a first lock actuation plate and a second release actuation plate and which is selectively actuated by a handle to seat and unseat relative to the seat back relative to the seat bottom.

2. Description of the Prior Art

The prior art is well documented with examples of seat recliner mechanisms, the objective in most instances being to provide a heavy duty and durable clutch mechanism resistant to the forces generated by most vehicle impact collisions. Application No. US/2002/0041120 A1, published to Glaspie et al., discloses a cone recliner/clutch mechanism (provided on either or both sides of a vehicle seat frame) in which a cylindrical element is attached to a back portion and a conically shaped element attached to a seat portion. The cylindrical element includes a conically tapered inner surface defined within a central opening, whereas the conically shaped element has an outer surface receivable within the central opening. The conically shaped element is movable between engaging and disengaging positions with relation to the tapered inner surface of the cylindrical element, by an actuating handle, and to permit adjustment of the seat back while performing adequately in a crash load condition.

U.S. Pat. No. 5,664,836, issued to Takagi, discloses a reclining device for a vehicle seat having a base arm and an upper arm rotatably connected via a shaft to the base arm, with an arcuate inwardly toothed portion formed in the upper arm. A lock gear member is rotatably supported of a pin fixed to the base arm and has an outwardly toothed portion meshed with the arcuate inwardly toothed portion of the upper arm. The lock gear member is operatively connected via a cam plate and interlocking elements to an operation lever. Motion of the lock gear member is thus confined to rotation about the pin and further such that the lock gear is moved via the cam plate and interlocking elements by handling the operation lever such that the outwardly toothed portion is brought into and out of meshing engagement with the inwardly toothed portion.

Finally, U.S. Pat. No. 6,390,557, issued to Asano, teaches a reclining mechanism for a vehicle seat composed of a first arm member for attachment to a frame structure of a seat cushion or a back rest of the vehicle seat, and a second arm member for attachment to a frame structure of the other of the back rest or seat cushion. In relevant part, the second arm member is further connected with the first arm member by means of a hinge pin for relative rotation about the hinge pin and includes a pair of diametrically opposed semi-circular ratchet portions concentric with the hinge pin. A pair of diametrically opposed semi-circular ratchet portions are arranged concentric with the hinge pin; a pair of diametrically opposed slide pawls further being slidably coupled with the first arm member in a radial direction with respect to the hinge pin and so as to be moved toward and away from the ratchet portions of the second arm member.

A cam element is further slidably coupled with the first arm member in a lateral direction perpendicular to the slide pawls and disposed between the slide pawls. The cam element is further operatively connected with the hinge pin to be moved by rotation of the hinge pin in the lateral direction for engaging the slide pawls with the ratchet portions of the second arm member and for disengaging the slide pawls from the ratchet portions of the second arm member. Whereby, the hinge pin is loaded by a torsion spring assembled thereon to bias the cam element in the lateral direction for maintaining the slide pawls in engagement with the ratchet portions of the second arm member.

SUMMARY OF THE PRESENT INVENTION

The present invention discloses a recliner clutch mechanism for use with a vehicle seat having a seat bottom and an upwardly extending arm forming a portion of a seat back. The clutch mechanism includes a non-rotating and bi-directionally actuating lock plate having first and second faces and which are established between a first lock actuation plate located in proximity to the first face and a second release actuation plate located in proximity to the second face. The lock plate is thereby sandwiched between the first and second actuating plates and in turn is arranged between the pivotally secured seat back and fixed seat bottom.

In a preferred embodiment, the lock plate and first and second actuation plates are maintained in their sandwiched relationship by a main pin securing also to both the seat back and seat bottom. An encircling and arrayed plurality of surrounding and secondary pins further engage the lock plate and first actuation plate and mount to the seat bottom so that, in combination, the lock plate is both translatable and non-rotatable and the actuation plates are in turn rotatable and non-translatable.

The first and second actuation plates each include a plurality of circumferentially arranged and offsetting ramp projections which alternatively coact with the opposite faces of the locking plate. In a preferred arrangement, the lock plate further includes first and second associated pluralities of likewise offsetting and arcuately extending channels, which align with the offsetting pluralities of ramp projections in the first and second actuating plates. Upon the selective rotation of the first and second actuating plates, the lock plate is caused to be translated between a first engaged position, in which an annular surface projection of the lock plate with exteriorly configured teeth interengage additional teeth located in a seating and inwardly recessed annular surface of the seat back, and a second release position in which the teeth associated with the lock plate are unseated from those associated with the seat back.

A main coil spring normally biases the seat back in a forward rotating and engaged position in which the ramps associated with the first actuation plate coact against the first face of the translatable lock plate. A first stop pin projects from the seat back and abuttingly engages a projection associated with the seat bottom to define a maximum forwardly inclined rotational position. A second stop pin projects from the seat bottom and abuttingly engages a projection associated with the seat back to define a maximum and rearwardly reclined position.

An outwardly curled end of the main coil spring engages the second stop pin to bias the seat back forwardly and an opposite and inwardly curled end of the main spring engages an anchor bracket tab. A release lever is pivotally secured to the seat bottom and supports a release lever coil spring, whereas a release handle is pivotally secured to a forward location of the seat bottom and interconnected to the release lever by a wire linkage.

Upon actuating the release handle, the ramp projections associated with the first actuation plate are rotated out of translating contact with first face of the lock plate, and such as by them seating into the associated and first arcuately extending channels defined within the lock plate. Concurrently, the second, and smaller, actuation plate is rotated so that its offsetting ramp portions unseat from within the second arcuately extending channels in the lock plate and, upon biasing against the second face of the lock plate, cause it to translate to the second and unseating position of the seat back relative to the seat bottom.

BRIEF DESCRIPTION OF THE DRAWINGS

Reference will not be made to the attached drawings, when read in combination with the following detailed description, wherein like reference numerals refer to like parts throughout the several views, and in which:

FIG. 1 is an environmental view of the recliner clutch mechanism shown from a first perspective and illustrating a first stop pin located upon the seat back and which abuttingly engages the seat bottom at a specified rotated position according to the present invention;

FIG. 2 is a further rotated and environmental perspective view of the recliner clutch mechanism and illustrating a second stop pin located upon the seat bottom and which abuttingly engages the seat back at a further specified rotated position according to the present invention;

DETAILED DESCRIPTION OF THE PREFERRED EMBODIMENTS

Figure 6:
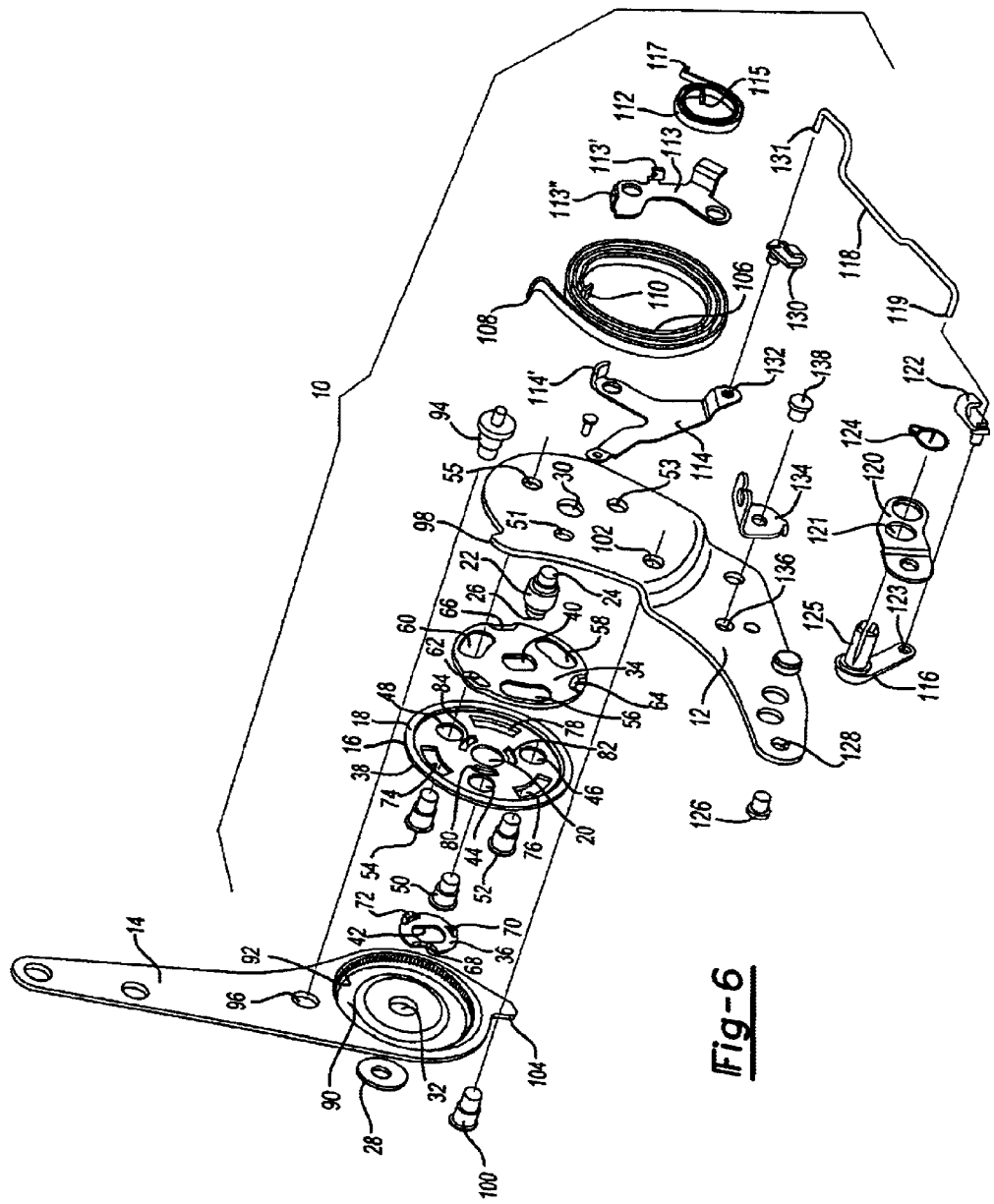
FIG. 6 is an exploded view of the recliner clutch according to the present invention.

Referring now to FIGS. 1, 2 and 6, a recliner clutch mechanism is illustrated at 10 according to a preferred embodiment of the present invention. The clutch mechanism is in particular incorporated into a vehicle seat assembly, such further including a lower plate 12 defining a portion of a seat bottom and an upwardly extending and pivotally associated plate (or arm) 14 forming a portion of a seat back.

As best illustrated in the exploded view of FIG. 6, the seat bottom 12 and seat back 14 each exhibit a specified shape and overall configuration consistent with typical seat assemblies, as is shown, and, for purposes of ease of illustration, the additional components typically associated with the vehicle seat assembly are for the most part not shown. However, and referring again to FIGS. 1 and 2, a pair of cup-style spacer assemblies 15 are illustrated in relation to the upwardly extending portion of the seat back arm 14 and to which is secured additional structure (again not shown) associated with the vehicle seat.

A lock plate exhibits a generally annular and disk shape with a projecting outer rim 16 and a recessed central portion 18. As best shown in FIG. 6, a main aperture is defined by an annular and inwardly extending surface 20 extending within a central portion of the lock plate and through which is inserted a main pivot pin 22. The main pivot pin 22 is constructed with a central and cylindrical shaped portion for supporting the central portion 18 of the lock plate in a non-rotative and limited translatable fashion. Opposite extending ends of the pivot pin, see at 24 and 26, are configured for engaging the seat bottom 12 and seat back 14, respectively, and a washer 28 is further provided for assisting in the engaged and rotative arrangement established with the seat back 14. As again best shown in FIG. 6, inwardly and annular defined surfaces 30, in the seat bottom 12, and at 32, in the seat back 14, establish the seating locations for the associated ends 24 and 26 of the main pivot pin 22.

A first actuating plate 34 is located in proximity to a first facing side of the lock plate (this corresponding to the facing surface defined by the outer rim 16 and recessed central portion 18 of the lock plate), and a second actuating plate 36 is located in proximity to a reverse and second facing side of the lock plate, see as generally identified at 38 in FIG. 6. Both the first actuation plate 34 and second actuation plate 36 include a configured central aperture, see at 40 and 42, respectively in the exploded view of FIG. 6 and which align with the main aperture 20 of the lock plate central portion 18. The configuration of both the apertures 40 and 42 is further such that the associated plates 34 and 36 are secured in a combined rotation and fixed translational relationship relative to the main pivot pin 22 inserted therethrough and the lock plate sandwiched therebetween.

A plurality of secondary circular apertures 44, 46 and 48 (see again FIG. 6) are defined in spatially arrayed and surrounding fashion around the main aperture 20 and through the central portion 18 of the lock plate. An equal plurality of secondary pins 50, 52 and 54 (see again FIG. 6) extend through the secondary circular apertures 44, 46 and 46 to further secure and support the lock plate in its combined. translating and non-rotative engagement relative to the seat bottom 12.

A plurality of elongated and arcuate shaped channels 56, 58 and 60 are defined in the first actuating plate and in substantially aligning fashion with the secondary circular apertures 44, 46 and 48 in the lock plate central portion 18. The secondary pins 50, 52 and 54 likewise extend through the arcuate shaped channels 56, 58 and 60 (and mount to apertures 51, 53 and 55 defined in the seat bottom 12) and so that the first plate 34 is rotatable over a selected distance defined between edge locations of the arcuately configured channels 56, 58 and 60 and the pins 50, 52 and 54 extending therethrough and in further cooperation with the degree of angular rotation associated with the actuation of the main pivot pin 22.

The first actuating plate 34 further includes a first plurality of circumferentially arranged and projecting ramps 62, 64, and 66 (FIG. 6) extending from a face thereof in opposing fashion relative to the first face defined within the central portion 18 of the lock plate. The second, and smaller diameter, actuating plate 36 likewise includes a second plurality of likewise circumferentially arranged and projecting ramps 68, 70 and 72 (see again FIG. 6) extending in engaging fashion against the second face (see again at 38 in FIG. 6) of the lock plate.

The lock plate further includes a first plurality of arcuately extending channels 74, 76 and 78 defined through its central portion 18 and which coact with the first plurality of projecting ramps 62, 64 and 66 to urge the lock plate in the first engaged position. A second plurality of arcuately extending channels 80, 82 and 84 are further defined through the central portion 18 in radially offset fashion relative to the first plurality of channels 74, 76 and 78 and which alternately coact with the second plurality of projecting ramps 68, 70 and 72 to urge the lock plate in the second release position. The first plurality of arcuately extending channels 74, 76 and 78 further define radially outwardly positioned channels, whereas the second plurality of arcuately extending channels 80, 82 and 84 define radially inwardly positioned channels.

Figure 3:
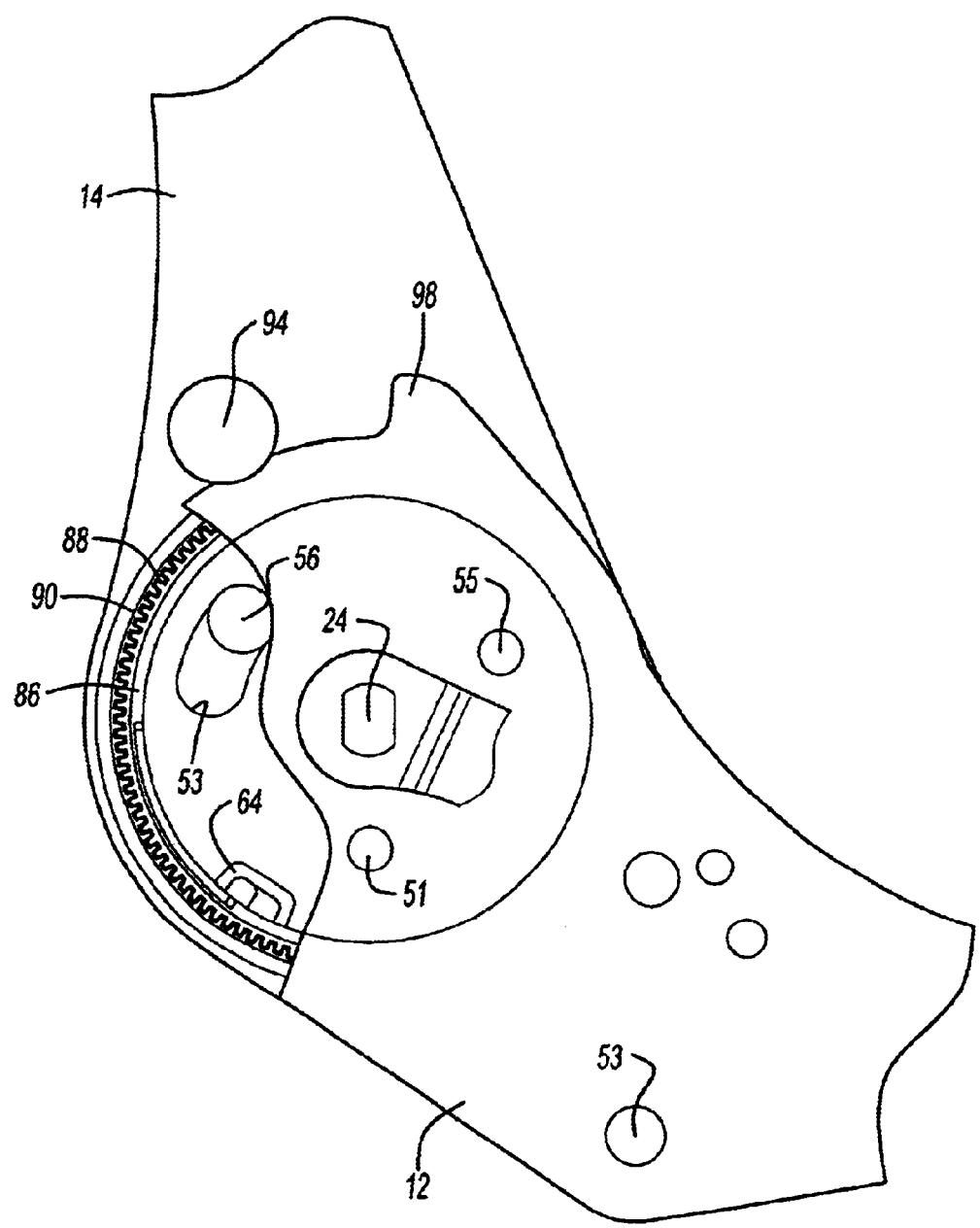
FIG. 3 is a plan view in partial cutaway and illustrating the manner in which toothed gear portions of the lock plate meshingly engaged within those associated with the seat back in the engaged position and according to the present invention.

Referring further to the cutaway illustration of FIG. 3, the second face of said lock plate further includes a projecting annular surface 86 defining a plurality of exteriorly facing and toothed gear portions 88. An opposing surface of the seat back 14, as best now shown in FIG. 6, includes a recessed annular surface 90, within which the opposing projecting annular surface 86 of the lock plate (hidden in view in FIG. 6) is capable of being seatingly received. The recessed annular surface 90 further defines a further plurality inwardly facing and toothed gear portions 92 which interengage said exteriorly facing geared portions 88 in the first engaged position.

A first stop pin 94 projects from the seat back 14 (see mounting aperture 96) and abuttingly engages a projection 98 of the seat bottom 12 to define a maximum forwardly inclined rotational position. A second stop pin 100 projecting from the seat bottom (see aperture 102) and abuttingly engages a projection 104 of the seat back 14 to define a maximum rearwardly reclined rotational position.

A main coil spring 106 (see FIG. 6) normally biases the seat back 14 in a forward rotating (see at 107 in FIG. 1) and engaged position in which the ramps 62, 64 and 66 associated with the first actuation plate 34 coact against the first face of the translatable lock plate. An outwardly curled end 108 of the main coil spring 106 engages the second stop pin 94 to bias the seat back 14 forwardly and an opposite and inwardly curled end 110 of the main spring 106 engages a tab 113" of an anchor bracket 113. The anchor bracket 113 includes a pair of holes which align with those identified at 53 and 55 of the seat bottom and in order to be secured thereto.

Referring again to FIG. 6, a release lever 114 is pivotally secured to the seat bottom 12 which interfaces with main pin end 24 and supports a release lever coil spring 112 shown in FIG. 6. The bracket 113 is provided for anchoring the main spring 106. The secondary and release lever coil spring 112 includes an inner curled end 115 which engages an anchor tab 114' of the release lever 114, as well as an outer curled end 117 which engages the bracket 113 (see tab 113').

A release handle 116 (see again FIG. 6) is pivotally secured to a forward location of the seat bottom 12 and interconnects to the release lever 114 by a wire linkage 118. A retaining bracket 120 receives the release handle 116 (see aperture 121) and a plastic retaining clip 122 engages an associated end 119 of the wire linkage 118 in interengaging fashion relative to aperture 123 defined within the handle 116. A small coil spring 124 engages an extending shaft portion 125 of the handle 116 and biases it relative to the retaining bracket 120 which is in turn mounted to the seat bottom 12, via rivet 126 and associated aperture 128. A further plastic retaining clip 130 engages an opposite end 131 of the wire linkage 118 and interconnects the same to an aperture 132 in an extending portion of the main release lever 114. See also a cable attachment bracket 134 secured to an aperture 136 in the seat bottom 12 via a pin 138.

Figure 4:
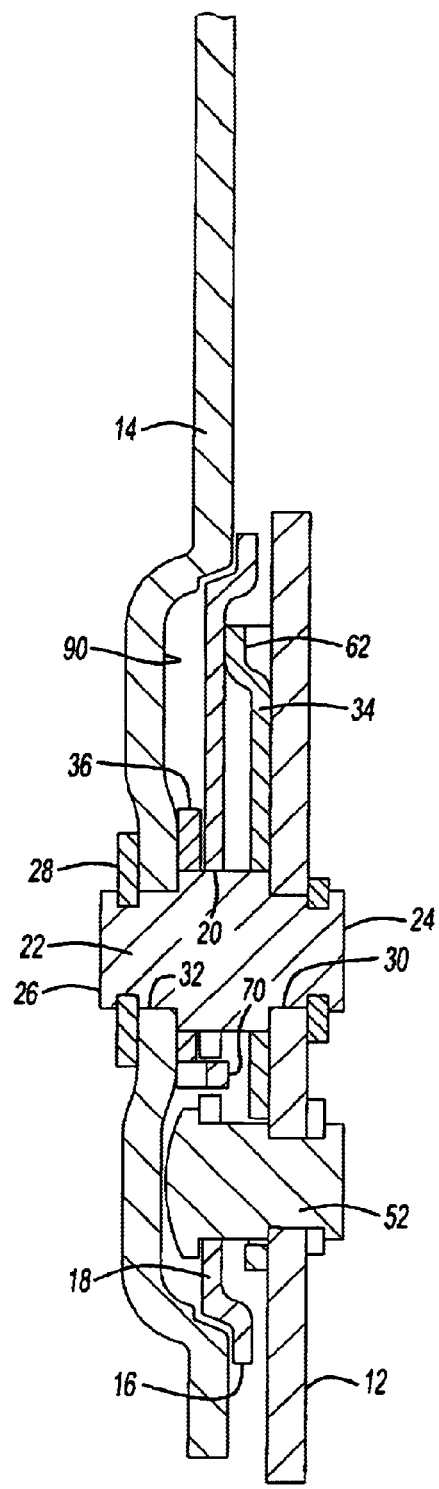
FIG. 4 is a side view illustrating the engaged position of the clutch mechanism according to the present invention.
Figure 5:
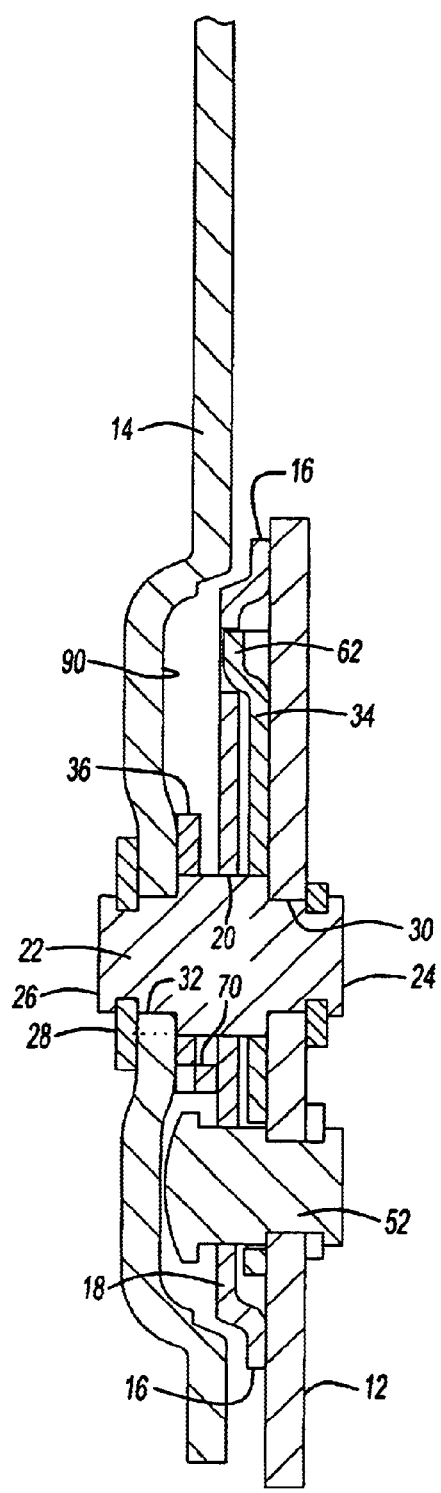
FIG. 5 is a further side view illustrating a release position of the clutch mechanism according to the present invention.

Upon actuating the release handle 116, the ramp projections associated with the first actuation plate 34 (see in particular projection 62 illustrated in the engaged and side profile cutaway of FIG. 4) are rotated out of translating contact with first face of the lock plate, and such as by them seating into the associated and first arcuately extending channels 74, 76 and 78 defined within the lock plate. Concurrently, the second, and smaller, actuation plate 36 is rotated so that its offsetting ramp portions (see in particular at 70 in FIGS. 4 and 5) unseat from within the second arcuately extending channels 80, 82 and 84 in the lock plate and, upon biasing against the second facing side of the central portion 18 of the lock plate, cause it to translate to the second and unseating position, see in particular FIG. 5, of the seat back 14 relative to the seat bottom 12.

Having described my invention, additional preferred embodiments will become apparent to those skilled in the art to which it pertains, and without deviating from the scope of the appended claims:

I claim:

1. A recliner clutch mechanism for use with a vehicle seat, the seat including a fixedly secured seat bottom and an upwardly extending and pivotally movable seat back, said mechanism comprising:

a lock plate having a first face and a second face and adapted to being secured in translating fashion between the seat bottom and the upwardly extending seat back;

a first actuating plate located in proximity to said first face of said lock plate and urging said lock plate to engage against the seat back in a first position;

a second actuating plate located in proximity to said second face of said lock plate and causing said lock plate to disengage from the seat back in a second release position;

a main spring associated with the seat bottom and adapted to engage the seat back in a forward rotating direction;

a secondary spring influencing said first actuating plate against the seat back in said first engaged position; and a release handle and lever assembly in operative communication with said secondary spring and actuated to influence said first and second actuating plates against said lock plate faces in said second release position and by which said lock plate is laterally translated in an unseating direction from the seat back and towards the seat bottom.

2. A recliner clutch mechanism for use with a vehicle seat, the seat including a fixedly secured seat bottom and an upwardly extending and pivotally movable seat back, said mechanism comprising:

a lock plate having a first face and a second face;

a main pivot pin extending between the seat bottom and the seat back, said lock plate being mounted to said main pivot in translating fashion between the seat back and seat bottom;

a first actuating plate located in proximity to said first face of said lock plate, said first actuating plate including a first plurality of projecting ramps coacting with said lock plate and urging said lock plate to engage against the seat back in a first engaged position;

a second actuating plate located in proximity to said second face of said lock plate, said second actuating plate including a second plurality of projecting ramps which are circumferentially offset from said first plurality of ramps and which coact with said lock plate and cause said lock plate to disengage from the seat back in a second release position;

the seat back being biased in a forward rotating direction; and a release handle and lever assembly being actuated to cause said first actuating plate to disengage said lock plate concurrent with said second plate actuating said lock plate to said second release position.

3. A recliner clutch mechanism for use with a vehicle seat, comprising:

a seat frame having a fixedly secured seat bottom and an upwardly extending and pivotally movable seat back;

said clutch mechanism further comprising a lock plate having a first face and a second face and adapted to being secured in non-rotatable and translatable fashion between said seat bottom and said upwardly extending seat back;

said second face of said lock plate further comprising a projecting annular surface defining a plurality of exteriorly facing and toothed gear portions, an opposing surface of the seat back having a recessed annular surface defining a further plurality inwardly facing and toothed gear portions which inter-engage said exteriorly facing geared portions in a first engaged position.

a first rotatable and non-translatable actuating plate located in proximity to said first face of said lock plate and urging said lock plate to engage against the sent back in said first position;

a second rotatable and non-translatable actuating plate located in proximity to said second face of said lock plate, in seating fashion between said projecting annular and recessed surfaces, said second plate causing said lock plate to disengage from the seat back in a second release position;

the seat back being biased in a forward rotating direction; and a release handle and lever assembly being actuated to cause said first actuating plate to disengage said lock plate concurrent with said second plate actuating said lock plate to said second release position.

4. A recliner clutch mechanism for use with a vehicle seat, the seat including a fixedly secured seat bottom and an upwardly extending and pivotally movable seat back, said mechanism comprising:

a lock plate having a first face and a second face and adapted to being secured in translating fashion between the seat bottom and the upwardly extending seat back;

a first actuating plate located in proximity to said first face of said lock plate and urging said lock plate to engage the seat back in a first position;

a second actuating plate located in proximity to said second face of said lock plate and causing said lock plate to disengage from the seat back in a second release position;

a main pivot pin extending between the seat bottom and seat back, said pivot pin extending through said lock plate and aligning apertures defined through said first and second actuating plates, said aligning apertures for receiving said main pivot pin extending through a substantially central location of said lock plate and said first and second actuating plates;

a main spring associated with the seat bottom and adapted to engage the seat back in a forward rotating direction;

a secondary spring influencing said first actuating plate against the seat back in said first engaged position; and a release handle and lever assembly in operative communication with said secondary spring and actuated to influence said first and second actuating plates against said lock plate faces in said second release position.

5. A recliner clutch mechanism for use with a vehicle seat, the seat including a fixedly secured seat bottom and an upwardly extending and pivotally movable seat back, said mechanism comprising:

a lock plate having a first face and a second face and adapted to being secured in translating fashion between the seat bottom and the upwardly extending seat back;

a first actuating plate located in proximity to said first face of said lock plate and urging said lock plate to engage the seat back in a first position;

a second actuating plate located in proximity to said second face of said lock plate and causing said lock plate to disengage from the seat back in a second release position;

a main pivot pin extending between the seat bottom and seat back, said pivot pin extending through said lock plate and aligning apertures defined through said first and second actuating plates, said lock plate further comprising a plurality of secondary circular apertures defined in spatially arrayed fashion about said main aperture, a plurality of secondary pins extending through said secondary circular apertures to secure said lock plate in a combined translating and non-rotative fashion relative to the seat bottom;

a main spring associated with the seat bottom and adapted to engage the seat back in a forward rotating direction;

a secondary spring influencing said first actuating plate against the seat back in said first engaged position; and a release handle and lever assembly in operative communication with said secondary spring and actuated to influence said first and second actuating plates against said lock plate faces in said second release position.

6. The recliner clutch mechanism as described in claim 5, further comprising a plurality of elongated and arcuate shaped channels defined in said first actuating plate and in substantially aligning fashion with said secondary circular apertures in said lock plate, said secondary pins likewise extending through said arcuate shaped channels so that said first plate is rotatable over a selected distance defined between edge locations of said channels and said secondary pins extending through said channels.

7. The recliner clutch mechanism as described in claim 6, said first actuating plate further comprising a first plurality of circumferentially arranged and projecting ramps extending in engaging fashion against said first face of said lock plate, said second actuating plate being rotationally mounted about said main pivot pin and comprising a second plurality of likewise circumferentially arranged and projecting ramps extending in engaging fashion against said second face of said lock plate.

8. The recliner clutch mechanism as described in 7, said lock plate further comprising a first plurality of arcuately extending channels defined through said lock plate and which coact with said first plurality of projecting ramps to urge said lock plate in said first engaged position, a second plurality of arcuately extending channels in said lock plate and which coact with said second plurality of projecting ramps to urge said lock plate in said second release position.

9. The recliner clutch mechanism as described in claim 8, said first plurality of arcuately extending channels defining radially outwardly positioned channels, said second plurality of arcuately extending channels defining radially inwardly positioned channels.

10. The recliner clutch mechanism as described in claim 8, further comprising said first and second pluralities of arcuately extending channels and said associated pluralities of projecting ramps being circumferentially offset relative to one another and alternately coacting with said lock plate in translating fashion between said first and second positions.

11. A recliner clutch mechanism for use with a vehicle seat, the seat including a fixedly secured seat bottom and an upwardly extending and pivotally movable seat back, said mechanism comprising:

lock plate having a first face and a second face and adapted to being secured in translating fashion between the seat bottom and the upwardly extending seat back, said second face of said lock plate further comprising a projecting annular surface defining a plurality of exteriorly facing and toothed gear portions, an opposing surface of the seat back having a recessed annular surface defining a further plurality of inwardly facing and toothed gear portions which inter-engage said exteriorly facing geared portions in said first engaged position;

a first actuating plate located in proximity to said first face of said lock plate and urging said lock plate to engage the seat back in a first position;

a second actuating plate located in proximity to said second face of said lock plate and causing said lock plate to disengage from the seat back in a second release position;

a main spring associated with the seat bottom and adapted to engage the seat back in a forward rotating direction;

a secondary spring influencing said first actuating plate against the seat back in said first engaged position; and a release handle and lever assembly in operative communication with said secondary spring and actuated to influence said first and second actuating plates against said lock plate faces in said second release position.

12. A recliner clutch mechanism for use with a vehicle seat, the seat including a fixedly secured seat bottom and an upwardly extending and pivotally movable seat back, said mechanism comprising:

a lock plate having a first face and a second face and adapted to being secured in translating fashion between the seat bottom and the upwardly extending seat back;

a first actuating plate located in proximity to said first face of said lock plate and urging said lock plate to engage the seat back in a first position;

a second actuating plate located in proximity to said second face of said lock plate and causing said lock plate to disengage from the seat back in a second release position;

a first stop pin projecting from the seat back and abuttingly engaging the seat bottom at a forwardly inclined rotational position, a second stop pin projecting from the seat bottom and abuttingly engaging the seat back at a rearwardly reclined rotational position;

a main coil spring associated with the seat bottom and adapted to engage the seal back in a forward rotating direction, a bracket biasingly interconnecting said main coil spring with said first stop pin;

a secondary spring influencing said first actuating plate against the seat back in said first engaged position; and a release handle and lever assembly in operative communication with said secondary spring and actuated to influence said first and second actuating plates against said lock plate faces in said second release position.

13. The recliner clutch mechanism as described in claim 12, said main spring further comprising an outwardly curled end engaging said first stop pin, and a corresponding and inwardly curled end engaging a tab of an anchor bracket also secured to the seat bottom.

14. A recliner clutch mechanism for use with a vehicle seat, the seat including a fixedly secured seat bottom and an upwardly extending and pivotally movable seat back, said mechanism comprising:

a lock plate having a first face and a second face and adapted to being secured in translating fashion between the seat bottom and the upwardly extending seat back;

a first actuating plate located in proximity to said first face of said lock plate and urging said lock plate to engage the seat back in a first position;

a second actuating plate located in proximity to said second face of said lock plate and causing said lock plate to disengage from the seat back in a second release position;

a main spring associated with the seat bottom and adapted to engage the seat back in a forward rotating direction;

a secondary spring influencing said first actuating plate against the seat back in said fist engaged position; and a release handle and lever assembly in operative communication with said secondary spring and actuated to influence said first and second actuating plates against said lock plate faces in said second release position, said release handle and lever assembly further comprising a release lever adapted to being pivotally secured to the seat bottom, said assembly further comprising a release lever pivotally secured to a forward location of the seat bottom, a wire linkage extending from said release handle at a first end and pivotally connecting to said release lever at a second end.

* * * * *

UNITED STATES PATENT AND TRADEMARK OFFICE
CERTIFICATE OF CORRECTION

PATENT NO. : 6,869,143 B2
DATED : March 22, 2005
INVENTOR(S) : Tyrone Secord

It is certified that error appears in the above-identified patent and that said Letters Patent is hereby corrected as shown below:

Title page,
Item [56], References Cited, U.S. PATENT DOCUMENTS, please remove the following references:
"4,871,416".
"5,534,312".
"5,686,789".
"5,736,002".
"5,782,986".
"6,194,833".
"6,214,707".
"6,284,050".
"6,326,301".
OTHER PUBLICATIONS, please remove all documents listed.

Column 4,
Line 35, "combined." should be replaced with -- combined --.

Column 9,
Line 8, "lock plate" should be replaced with -- a lock plate --.

Signed and Sealed this

Twenty-third Day of August, 2005

JON W. DUDAS
*Director of the United States Patent and Trademark Office*